United States Patent [19]

Kojima et al.

[11] 4,074,280
[45] Feb. 14, 1978

[54] THERMAL RECORDING APPARATUS

[75] Inventors: Yasuyuki Kojima, Hitachi; Kiyohiko Tanno, Katsuta; Tetsuo Doi, Hitachi; Kunio Ono, Katsuta, all of Japan

[73] Assignee: Hitachi, Ltd., Japan

[21] Appl. No.: 740,680

[22] Filed: Nov. 10, 1976

[30] Foreign Application Priority Data

Nov. 15, 1975 Japan .................................. 50-137633

[51] Int. Cl.² .............................................. G01D 15/10
[52] U.S. Cl. .................................... 346/76 R; 219/216
[58] Field of Search ...................... 346/76 R; 219/216; 197/1 R

[56] References Cited

U.S. PATENT DOCUMENTS 3,467,810 9/1969 Cady .............................. 346/76 R X
3,984,844 10/1976 Tanno .................................. 346/76 R

*Primary Examiner*—Joseph W. Hartary
*Attorney, Agent, or Firm*—Craig & Antonelli

[57] ABSTRACT

A thermal recording apparatus for recording an information signal on the heat-sensitive recording medium in a form of visible information comprises a plurality of heat-generating resistance elements, a drive circuit for supplying selectively drive current to said heat-generating resistance elements in response to the information signal, a recording medium disposed in contact with the plurality of heat-generating resistance elements and adapted to change color upon sensing heat, means for driving the plurality of heat-generating resistance elements and the recording medium relative to each other, and a switching circuit means for inverting the direction of the drive current applied to the heat-generating resistance elements in a predetermined manner.

7 Claims, 6 Drawing Figures

THERMAL RECORDING APPARATUS

BACKGROUND OF THE INVENTION

The present invention relates to a thermal recording apparatus such as a thermal facsimiles recording or the like and in particular to an improvement of the recording head for the thermal recording apparatus in respect of durability.

In general, the thermal recording apparatus comprises a plurality of heat-generating resistance elements adapted to be selectively applied with pulse-like current, wherein Joule heat as generated is transmitted to a recording medium such as a paper applied with a layer of material which responds to the heat and changes the color thereof in contrast to the background color thereby to form visible information recorded thereon. The pulse-like drive current is controlled in dependence upon the information signal so that the visible information may be recorded on the medium in accordance with the information signal.

In the thermal recording apparatus, a unit which comprises a plurality of heat-generating resistance elements, a plurality of electrodes for applying selectively current to the heat-generating resistance elements and a plurality of lead wires connected to the electrodes is referred to as a recording or printing head.

As is known in the art, when a direct current or d.c. voltage is applied to a conductor having a high resistivity through lead wires having a low resistivity, metal ions are diffused from the lead wire at which negative potential is applied into the conductor at the boundary region therebetween, which region will become discolored and deteriorated in quality after long use.

It is known that undesirable deteriorating phenomenon will also occur in the recording or printing head of the thermal recording apparatus at the region in the vicinity of the boundary between the heat-generating resistance elements and the electrodes for applying a negative potential to the resistance elements. In this connection, the deterioration procedes rapidly in the case of the recording head since the heat-generating resistance elements are heated at a high temperature. As an attempt to obviate the deterioration, it is known to select appropriate materials for the electrodes and the resistance elements. However, such attempts are necessarily accompanied with an increased expenditure. Further, the recording head manifactured in this way is unsatisfactory in respect of the resistance to repeated thermal cycles.

SUMMARY OF THE INVENTION

An object of the invention is therefore to eliminate the above described disadvantage of the conventional thermal recording apparatus.

Another object of the present invention is to provide an improved thermal recording apparatus which may be used over a lengthed duration with a high stability.

According to an aspect of the invention, there is provided a thermal recording apparatus which includes switching means for inverting the direction of drive current selectively fed to the heat-generating resistance elements, thereby to obviate electrically the deteriorating tendency of the heat-generating resistance elements.

DESCRIPTION OF THE PREFERRED EMBODIMENTS

Before entering into detailed description of preferred embodiments of the invention, typical examples of a hitherto known thermal recording apparatus and recording head to which the invention is directed and may be applied will be first described for a better understanding of the invention.

Figure 1:
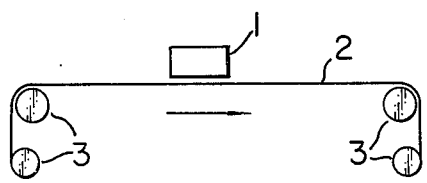
FIG. 1 shows schematically a general arrangement of a typical thermal recording apparatus.
Figure 2:
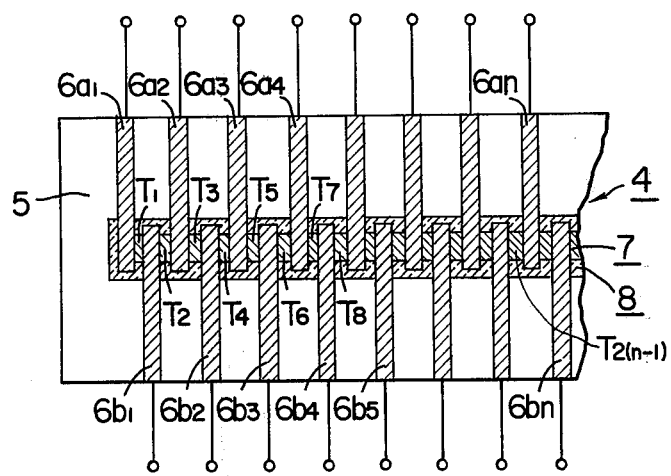
FIG. 2 shows in a sectional plan view a typical recording head employed conventionally in a typical thermal recording apparatus.

Referring to FIG. 1 which shows schematically a typical example of the thermal recording apparatus, a recording head 1 is positioned in contact with a heat-sensitive recording medium 2 which changes it color in response to heat as applied from the recording head. The recording medium 2 is moved relative to the recording head 1 by means of a drive system so that information may be sequentially recorded in the medium 2 in accordance with the information signal applied to the head 1 for the energization thereof. A typical example of such recording head is disclosed in U.S. patent application Ser. No. 633,115 of K. Tanno et al entitled "Thermal Recording Apparatus" filed on Nov. 18, 1975 and issued as U.S. Pat. No. 3,984,844 on Oct. 5, 1976 and now assigned to the same assignee as the present application. The recording head of this prior patent is of such construction as is shown in FIG. 2. In the figure, the thermal printing or recording head denoted generally by reference numeral 4 comprises $n$ lead electrodes $6a_1$, $6a_2$, . . ., $6a_n$ and $n$ counterpart lead electrodes $6b_1$, $6b_2$, . . ., $6b_n$ which are made of silver-palladium or the like alloy and printed on an insulation substrate such as ceramic plate extending from the opposite sides of the substrate in a predetermined zig-zag or interlaced pattern. Heat-generating resistance material 7 such as ruthenium-silver or the like is deposited on the insulation substrate in a strip-like pattern so as to electrically contact with the interlaced portions of the opposite lead electrodes. In this manner, the heat-generating resistance strip 7 is electrically divided by paired opposite electrodes $6a_1$ and $6b_1$, $6a_2$ and $6b_2$, . . ., $6a_n$ and $6b_n$ into $2(n-1)$ segments which constitutes, respectively, heat-generating resistance elements $T_1$, $T_2$, . . ., $T_{2(n-1)}$. A protection layer 8 of glass or the like material is deposited on the resistance strip 7 in order to increase the abrasion-resistance thereof. It will thus be appreciated that when a plurality of paired opposite electrodes are selectively energized in accordance with electrical information signals to be recorded, the corresponding resistance elements interposed between the energized electrodes will generate heat, whereby the information is visually recorded on the heat-sensitive medium 2. In this connection, the durability or useful life of the thermal recording apparatus depends on the durability of the recording head which in turn is influenced generally by the abrasion-resistance thereof as well as the thermal and electrical stability of the heat-generating resistance elements. The abrasion-resistance which is required in view of the fact that the recording head is maintained in physical contact with the recording medium is usually assured by depositing a layer of high abrasion-resistance material such as a protection layer of glass 2 on the portions of the heat-generating resistance elements which make contact with the recording medium. The electrical and thermal stability of the recording head as required inherently is determined by the property or nature per se of the material forming the heat-generating resistance elements and the lead electrodes. With aim to enhance the required stability, it is known to use ruthenium-silver added with yttrium as the material for the heat-generating resistance elements and gold-palladium for the lead electrodes. However, these materials are unsatisfactory in respect of the durability for the repeated thermal cycles. For example, when the recording or printing head has undergone the repeated thermal cycles during long use, the performance characteristics of the recording head will be changed due to oxidation, reduction or dislocation of metals forming the heat-generating resistance elements and/or anodic oxidation and cathodic reduction of the electrode material as brought about when driven with a large current. Further, the recording head may eventually be physically destroyed due to accumulation or remanence of mechanical and thermal stresses.

Figure 3:
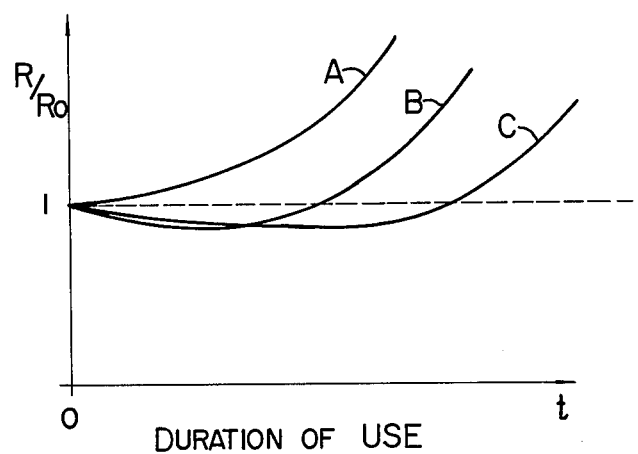
FIG. 3 shows graphically the characteristic of deterioration of heat-generating resistance elements for the recording head as a function of time or use duration.

FIG. 3 graphically shows by way of example the changes of characteristics (ratio between the initial resistance $R_O$ and the resistance R after use) of the heat-generating resistance element of a hitherto known recording head as a function of time of use $t$. When the recording head is driven with a large current, the characteristics change of the heat-generating resistance will become such as represented by the curve A, while the characteristics will change as shown by the curve B when the recording head is driven with electric power slightly lower than the rated one. In both cases, however, it has been found that discoloration will ultimately occur in the individual heat-generating resistance elements at the regions in the vicinity of the electrodes applied with negative potential. It is thus believed that the influential factors for the characteristic change of the heat-generating resistance elements will be the temperature attained by the heat generation and the direction of current flow which will bring about changes of composition for the material constituting the resistance element as a result of the dislocation of metal elements, anodic oxidation and cathodic reduction. In more particular, the recording head used in the experiment to measure the characteristic change described above was the one which is composed of heat-generating elements and driving electrodes manufactured starting from a paste of silver compound through a conventional thick-film printing process as is usual in the hitherto known printing head of this type. Since silver is a mobile metal element, it is believed that the silver ions produced in the electrodes applied with a negative potential will be diffused into the heat-generating resistance elements at the boundary regions between the electrodes and the resistances when d.c. potential is applied between the electrodes, which gives rise to the discoloration and the deterioration in the characteristic as can be seen from the results of experiment illustrated in FIG. 3. In general, when electrical conductivity of conductors is to be increased by employing suitable metal compounds or alloys, changes and deterioration in the physical properties will occur more or less in the boundary between the regions of different metal substances upon heating the conductors by electric current due to the differences in the tendency of ionization as well as in the composition of different metal compounds or alloys regardless of the manufacturing process such as thick-film technic. Of course, in the case of the elements employed in general electronic circuits, the temperature produced in the elements upon the circuit operation will be about 100° C at highest and hence the change or deterioration on the characteristics of such elements will be correspondingly of a negligible order. On the contrary, the printing head for the thermal recording apparatus is heated to an extremely high temperature (on the order of 400° C), involving thus remarkable change or deterioration in the characteristics of the heat-generating resistance elements and hence the printing or recording head per se. At any rate, it has been experimentally found that the recording head for the thermal recording apparatus undergoes changes in the performance characteristic as described above. Such undesirable phenomenon can not be overcome merely by regulating the electric power of the power source for the thermal recording apparatus. The recording head has thus a shorter use life as compared with other part of the recording apparatus and requires frequent exchange, involving difficulties in the designing of the recording apparatus in respect of durability.

As an attempt to solve the above problem, it is easily conceivable to select for the material of the electrodes a metal compound or alloy whose metal elements are ionized or diffused only with difficulty. Even in such case, however, it is substantially impossible to inhibit positively the diffusion, not to speak of the difficulty involved in the selection of the desirable materials as well as high expenditure of such material.

In the thermal printing or recording apparatus according to the invention which is made with a view to eliminating the above difficulties, the direction of current with which the heat-generating resistance elements are driven is inverted in a predetermined manner.

Figure 4:
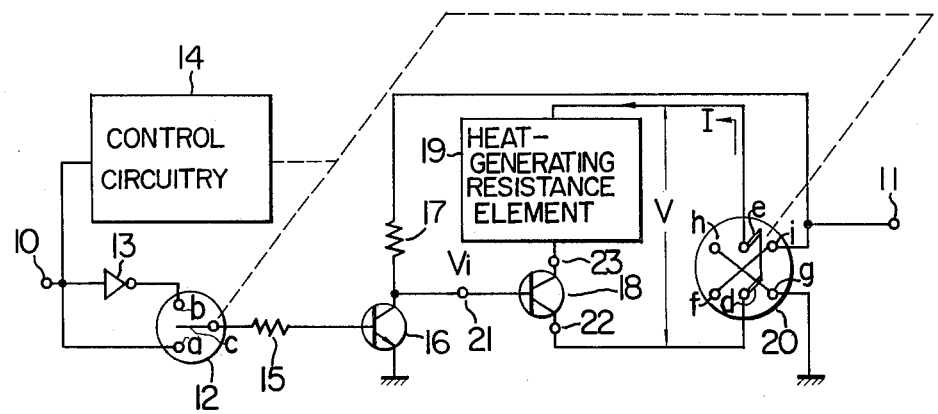
FIG. 4 is a circuit diagram of a thermal recording apparatus according to an embodiment of the invention.
Figure 5:
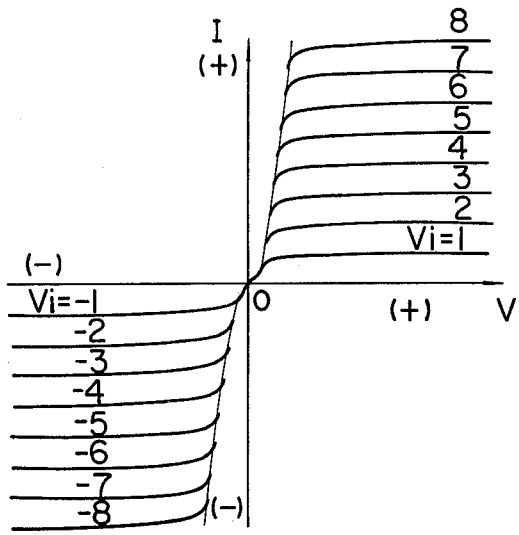
FIG. 5 shows voltage-current characteristics of a bi-directional current control element employed in the embodiment shown in FIG. 4.

Now, a first embodiment of the invention will be described with reference to FIG. 4. In the figure, reference numeral 10 denotes an input terminal to which information signals to be recorded is applied in the form of a pulse train. The drive current for the recording head is applied to the termianal 11 from an external current supply source (not shown). The information signal input terminal 10 is connected to a fixed terminal $a$ of a single-pole double-throw switch 12 and at the same time connected to a fixed or stationaly terminal $b$ thereof through a inverter 13. Further, the terminal 10 is connected also to a control circuitry 14. A movable piece $c$ of the switch 12 is connected to a control electrode of a switching element, e.g. a base electrode of a NPN-transistor 16 by way of a resistor 15 for controlling the base current. The switching transistor 16 has a grounded emitter electrode and a collector electrode which is connected to the terminal 11 through a load resistor 17 and directly to a control electrode 21 of a bi-directional current control element 18 which has a first electrode 22 connected to a movable piece $d$ of a double-pole double-throw switch 20 and a second electrode 23 connected to another movable piece $e$ of the switch 20 by way of a heat-generating resistance element 19. The double-pole double-throw switch 20 has a fixed terminal $g$ grounded and the other fixed or stationary terminal $i$ connected to the terminal 11. The bi-directional current control element 18 exhibits voltage-current characteristics such as shown in FIG. 5 in which Vi represents the input voltage applied to the control electrode or the collector voltage of transistor 16, V represents the driving voltage and I represents the drive currents as is also indicated in FIG. 4. The control circuitry 14 is so arranged that it may change-over the single-pole double-throw switch 12 and the double-pole double-throw switch 20 through the interlocked movable pieces $c$ and $d$ and $e$ thereof when the information signal counted by the control circuitry 14 has attained a predetermined value.

Operation of the circuit shown in FIG. 4 will next be described. It is assumed that the movable piece $c$ of the switch 12 is changed over to the terminal $a$ with the movable pieces $d$ and $e$ to the terminal $g$ and $i$, respectively, and that the information signal is applied to the input terminal 10, while a positive d.c. voltage is applied to the terminal 11. The information signal in a form of a pulse having a high amplitude or level is applied to the base electrode of the transistor 16 through the switch 12 and the resistor 15 thereby to turn on the transistor 16. When the transistor 16 thus becomes conductive, drive current will flow from the terminal 11 to the collector electrode of the transistor 16 through the resistor 17, resulting in a low potential level at the control electrode 21. Accordingly, the bi-directional current control element 18 allows the passage of current only from the second electrode 23 to the first electrode 22. The drive current will then flow through the heat-generating resistance element 19 to the bi-directional current control element 18 by way of the stationary terminal $i$ and a movable contact $e$. The resistance element 19 will thus generate heat thereby to record the corresponding information in a heat-sensitive recording medium or paper 2 (FIG. 2) as a visible colored image contrasting with a background color of the recording medium.

When the information signal has terminated with the pulse voltage thereof reset to a low level, the transistor 16 is turned-off or non-conductive with the collector potential thereof being lowered. Consequently, the path from the first electrode 22 to the second electrode 23 of the bi-directional current control element 18 is biased forwardly and the drive current is inhibited from flowing to the heat-generating element 19 and the bi-directional current control element 18. Under these conditions, no record is made on the recording paper.

When a predetermined quantity or number of the information signals are applied to the input terminal 10 and a corresponding number of recordings has been performed on the recording medium in the above described manner, the control circuitry 14 which discriminates such predetermined number will then change over the movable contact $c$ to the stationary contact $b$ of the single-pole double-throw switch 12 and at the same time the interlocked movable contacts $d$ and $e$ of the double-pole double-throw switch 20 to the stationary contacts $f$ and $h$. When information signal in the form of a pulse having a high voltage level is applied to the terminal 10 in this state, the signal is inverted at this time through the inverter 13 into a low level signal, which is then applied to the base electrode of the transistor 16 through the switch 12 and the resistor 15, thereby to turn on the transistor 16. The bi-directional current control element 18 will then permit the current flow from the first electrode 22 to the second electrode 23. The drive current will thus flow from the terminal 11 to the heat-generating resistance element 19 through the stationary contacts $i$ and $f$ and the movable contact $d$ of the switch 20 and the bi-directional current control element 18. The resistance element 19 is thus heated to produce a colored record on the recording paper.

Termination of the information signal as recorded will result in a high level signal at the output of the inverter 13 which is then applied to the transistor 16 to turn it conductive. Consequently, the control electrode 21 will become at a low level, whereby no current may flow from the first electrode 22 to the second electrode 23. The heat-generating resistance element will then remain de-energized.

It will be understood from the above description that, when the movable contacts $c$ of the single-pole double-throw switch 12 is changed over to the stationary contact $a$ with the movable pieces $c$ and $d$ of the double-pole double-throw switch 20 thrown to the fixed contacts $g$ and $i$, the drive current will flow from the second electrode we to the first electrode 22 in response to the information signal to be recorded. On the contrary, when the movable contact $c$ of the switch 12 is changed over to the stationary contact $b$ with the movable contacts $d$ and $e$ of the switch 20 thrown to the stationary contacts $f$ and $h$, the direction of the drive current is inverted and the current flows through the control element 18 from the first electrode 22 to the second electrode 23 of the control element in response to the information signal.

It has been experimentally determined that the characteristics or the performance stability of the heat-generating resistance element 19 is highly improved as is shown in FIG. 3 by the curve C in accordance with the inventive drive system. In reality, when the drive current is the same as is in the case of the hitherto known driving system with the other influential parameters selected the same, the recording head driven in accordance with the teaching of the invention can enjoy a lengthened use life more than twice as long as that of the recording head driven on the basis of the prior known method.

It is believed that the advantageous obtained with the arrangement according to the invention will be ascribable to the fact that one and the same electrode is subjected to repeated anodic oxidization and the cathodic reduction of which are thus compensated for each other and that the overall effect of dislocations or displacements of metal ions are neutralized.

The discoloration produced in the heat-generating resistance element at the region adjacent to the electrode applied with a negative potential in the hitherto known drive system takes place at the regions in the vicinity of all the electrodes applied alternatively with the negative and positive potentials in the drive system according to the invention. However, it has been found that such discoloration is suppressed to a great degree as compared with the case of the prior known drive system.

The change-over of the switches 12 and 20 should be preferably effected for every recording operations. However, in practice, it may often happen that no recording is made for a long time, e.g. 1 to 2 minutes depending on the contents of the input information to be recorded. Further, change or variation in the characteristics of the recording head can be suppressed significantly in accordance with the invention, as describe above. In consideration of these fact, the switching-over through the switches 12 and 20 may be most efficiently carried out for every 1000th to 100,000th recording operations for practical applications.

Figure 6:
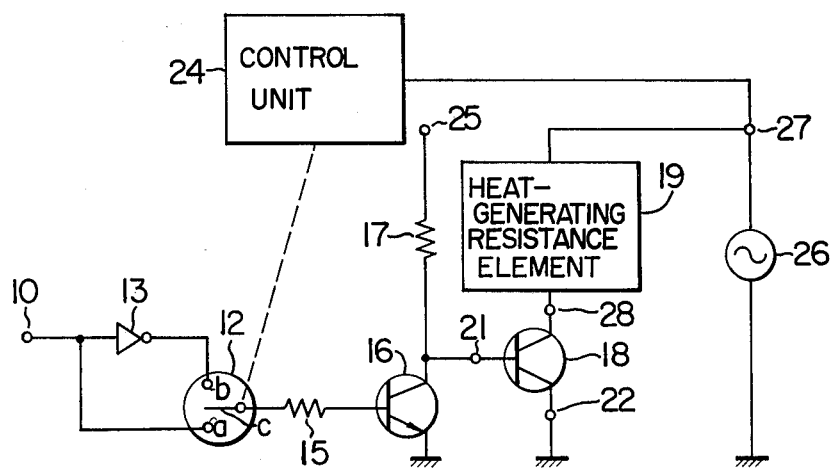
FIG. 6 is a circuit diagram showing a thermal recording apparatus according to another embodiment of the invention.

FIG. 6 is a circuit diagram showing a second example of a drive system for a recording head of the thermal recording apparatus according to the invention. In the figure, the circuit elements serving for the same functions as those shown in FIG. 4 are denoted by the same reference symbols. It is to be noted that an alternative current or a.c. power source 26 is employed in this embodiment. The control unit 24 is so arranged as to change-over the single-pole double-throw switch 12 in dependence upon the polarities of the a.c. current source 26. The d.c. current is applied to the terminal 25 from a d.c. current source (not shown) and supplied to the collector electrode of the transistor 16 through the resistor 17.

It is now assumed that a positive half cycle of the a.c. source 26 begins and the positive half-wave voltage is applied to the terminal 27 (note that such assumption of polarity is merely for the convenience of the discussion). Then, the positive voltage is applied to the control unit 24 which in turn changes over the movable contact piece c of the switch 12 to the fixed contact a in response to the applied voltage. Consequently, when an information signal to be recorded is concurrently applied to the terminal 10, the transistor 16 is turned on or conductive, lowering the potential level at the control electrode 21. As a result, the drive current will flow through the bi-directional current control element 18 from the terminal 27 by way of the heat-generating resistance element 19. On the other hand, when no information signal is applied to the terminal 10, the transistor 16 remains non-conductive with the potential of a high level prevailing at the control electrode 21, which results in no current flow through the heat-generating resistance element.

When the negative half-cycle of the a.c. power source 26 begins, the control unit 24 will change over the movable contact piece c of the switch 12 to the fixed contact b in response to the negative voltage applied thereto. When the information signal is present at the terminal 10, the signal is then inverted by the inverter 13 and applied to the base electrode of the transistor 16 to turn off the latter. Since the potential at the control electrode 21 is at a high level, the drive current is permitted to flow through the bi-directional current control element 18 and the heat-generating resistance element 19 to the terminal 27. If no information signal is present at the terminal 10, voltage of a high level is applied to the base electrode of the transistor 16 which is then turned on to lower the potential level at the control electrode 21. No drive current is permitted to flow through the heat-generating resistance element 19.

As will be appreciated from the above description, in the case of the second embodiment shown in FIG. 6, the switch 12 is changed ovwer in dependence upon polarities of the drive current and a.c. drive current will flow through the heat-generating resistance element 19 in response to the information signal. The frequency at which the drive current is inverted may be easily and arbitrarily selected for an appropriate number of times of recording operations by correspondingly selecting the frequency of the a.c. source 26.

The invention is never restricted to the embodiments described above and shown in the drawings. Although the description has been made in conjunction with the embodiments including a single heat-generating resistance element, it will of course be obvious that the invention can be equally applied to such a recording head which includes a plurality of heat-generating resistance elements as well as a plurality of associated paired electrodes. Further, any type of distribution system for the information signal as well as arrangements of the drive electrode may be empolyed in combination with the drive system according to the invention. In place of the bi-directional current control means of the characteristics described hereinbefore, other bidirectional current control means such as a bi-directional current control thyristor may be employed with some modifications in the circuit design without departing from the scope of the invention. Furthermore, the inversion of drive current direction for 1000 to 100,000 times of recording operations described hereinbefore is merely by way of example for the practical applications and therefore should not be interpreted in any restrictive sense.

It will now be fully understood that the progressive changes in the characteristics of the heat-generating resistance element of the recording head for a thermal recording apparatus can be suppressed to a large degree and the durability of the recording head is significantly enhanced in accordance with the teachings of the invention, which in turn leads to a remarkably lengthed use life and improved reliablility of the thermal recording apparatus.

We claim:

1. A thermal recording apparatus comprising:
   a plurality of heat-generating resistance elements;
   a driving circuitry adapted to supply drive current selectively to selected one(s) of said heat-generating resistance element(s) in response to signal representing information to be recorded;
   a recording medium disposed in contact with said plurality of heat-generating resistance elements and adapted to be changed in color by said selected heat-generating resistance element(s);
   means for moving said plurality of heat-generating resistance elements and said recording medium relative to each other; and
   switching circuit means for inverting the direction of said drive current supplid to said selected heat-generating resistance element(s) in a predetermined manner.

2. A thermal recording apparatus as set forth in claim 1, wherein said switching circuit means is adapted to repeatedly invert the direction of said drive current applied to said selected heat-generating resistance element(s) for every predetermined quantity of said information signal to be recorded.

3. A thermal recording apparatus as set forth in claim 1, wherein said switching circuit means is adapted to invert the direction of said drive current supplied to said selected heat-generating resistance elements for every predetermined time interval.

4. A thermal recording apparatus as set forth in claim 2, including:
   input terminal means for the signal representing the information to be recorded;
   input means for receiving said drive current from an external current source;
   inverter circuit means connected to said input terminal;
   a controllable switching element connected to said input means for said drive current, switchable means for alternatively connecting a control electrode of said switching element to the outputs of said input terminal for information signal and said inverter circuit means;

a semiconductor element for responding to the conducting and the non-conducting states of said switching element to permit said drive current to flow through said heat-generating resistance elements exchangeably and selectively in one of both directions;

means connected in series to said heat-generating resistance elements and said semiconductor element for inverting said drive current; and means connected to said input means for said information signal for changing over said connecting means and said inverter means in an interlocked manner when said information signal has attained said predetermined quantity.

5. A thermal recording apparatus as set forth in claim 4, wherein said switching element is composed of a transistor and said semiconductor element is composed of a bi-directional current control element.

6. A thermal recording apparatus as set forth in claim 1, including:

input terminal means for said information signal to be recorded;

means for receiving said drive current from an external a.c. power source;

inverter circuit means connected to said input terminal means;

a switching element having a control electrode, switchable means for alternatively connecting said control electrode of said switching element to the outputs of said input terminal means and said inverter circuit means;

a semiconductor element for responding to the conducting and the non-conducting states of said switching element to permit said drive current to flow through said heat-generating resistance element exchangeably and alternatively in one of both directions; and means connected to said input means for said drive current and adapted to change over said connecting means in dependence upon the polarities of said drive current.

7. A thermal recording apparatus as set forth in claim 6, wherein said switching element is composed of a transistor and said semiconductor element is composed of a bi-directional current control element.

* * * * *